United States Patent Office 2,941,979
Patented June 21, 1960

2,941,979

VULCANIZATION PROCESS

Hans Pohle, Leverkusen, and Friedrich Lober, Leverkusen-Bayerwerk, Germany, assignors to Farbenfabriken Bayer Aktiengesellschaft, Leverkusen, Germany, a corporation of Germany No Drawing. Filed Feb. 6, 1957, Ser. No. 638,458

Claims priority, application Germany Feb. 8, 1956

3 Claims. (Cl. 260—45.8)

The present invention relates to an improved vulcanization process, more particularly, it concerns the process of improving the mechanical properties of rubber vulcanizates.

p-Phenylene diamines which may contain alkyl-, isoalkyl-, cycloalkyl- or aryl radicals in varying combinations attached to the nitrogen atoms, have heretofore been used as antioxidants in vulcanizates made of natural or synthetic rubber. These compounds are added to the vulcanizates to render them stable to fatigue and to attack by ozone. Among the best known products of p-phenylene diamines are N,N'-diphenyl-p-phenylene-diamine, and N-cyclohexyl-N'-phenyl-p-phenylene-diamine.

Furthermore it is known that the resistance to ageing and fatigue effected by 2,2,4-trimethyl-dihydroquinolines which are unsubstituted in the aryl radical is inferior to the protective effect achieved with p-phenylene diamines. Moreover, 6-ethoxy-2,2,4-trimethyl-dihydroquinoline has been proposed as protective agent against attack by ozone.

However, as compared with compounds useful for obtaining protection against attack by ozone, for instance compounds of the p-phenylene-diamine series, the aforesaid compound provides only an unsatisfactory protection against formation of cracks under dynamic stresses and a minor protection against attack by ozone.

In accordance with the invention it has now been found that an improved protective effect against the formation of cracks of the vulcanizates under dynamic stresses can be imparted to vulcanizates of natural and synthetic rubber by adding to the rubber mixtures prior to vulcanization a mixture of the afore-defined p-phenylene diamines and 2,2,4-trimethyl-dihydroquinolines of the formula

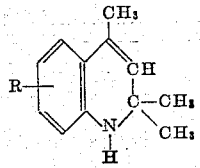

wherein R stands for an alkoxy group. The process of the invention ensures a synergistic effect, since the protective effect insured against the formation of cracks is greater than could be expected of the individual compounds added to the vulcanizates.

Suitable p-phenylene-diamines according to the invention are for instance N,N'-diphenyl-p-phenylene-diamine, N-isopropyl-N'-phenyl-, N-isohexyl-N'-phenyl-, N-isooctyl-N'-phenyl-, N-cyclohexyl-N'phenyl- as well as N,N'-di-isopropyl-, N,N'-diisobutyl-, N,N'-diisooctyl-p-phenylene-diamine and N,N'-dicyclohexyl-p-phenylene-diamine.

Examples of suitable 2,2,4-trimethyl-dihydroquinolines which are substituted in the phenyl radical by an alkoxy group are 6-ethoxy-2,2,4-trimethyl-dihydroquinoline, 6-isopropoxy-2,2,4-trimethyl-dihydroquinoline and 6-sec.-butoxy-2,2,4-trimethyl-dihydroquinoline.

In general, it is advantageous to add to the vulcanizates the mixture of p-phenylene-diamines and 2,2,4-trimethyl-dihydroquinolines at a proportion of 75–25 parts of the p-phenylene-diamine and 25–75 parts of the 2,2,4-trimethyl-dihydroquinoline. The most favorable mixing proportion to be chosen in a specific case can easily be determined by a preliminary test.

The mixture of p-phenylene diamines and 2,2,4-trimethyl-dihydroquinolines is added to the rubber mixtures in amounts customarily applied in the art. In general, the mixture is added in a proportion of 0.1–5%, preferably 0.25–3%, referred to the amount of rubber. In specific cases it may be advantageous to add larger quantities of the mixture. Moreover, it is possible according to the invention to add the mixture proposed according to the invention in combination with previously known antioxidants.

The hereindescribed antioxidants may be used for natural rubber and synthetic rubber-like polymers obtained for instance from conjugated diolefins or copolymers of conjugated diolefins with polymerizable vinyl compounds such as styrene, acrylonitrile, acrylates and methacrylates and similar compounds.

The invention is further illustrated by the following examples without being restricted thereto the parts given by weight, if not otherwise stated.

EXAMPLE 1

A rubber mixture consisting of:

100 parts of natural rubber
32.5 parts of furnace black (Philblack O)
11.0 parts of furnace black (Philblack A)
2.7 parts of zinc oxide
3.0 parts of pine tar
2.5 parts of stearic acid
2.5 parts of sulfur
0.25 parts of benzothiazol-2-cyclohexylsulfeneamide and
0.25 parts of di-benzothiazyl-disulfide is divided into 6 parts and each part is mixed with one of the following antioxidants or mixture of antioxidants. The antioxidants are added at a proportion of 1% by weight each referred to the rubber content.

(1) N,N'-diphenyl-p-phenylene-diamine;
(2) A mixture consisting of 75 parts N,N'-diphenyl-p-phenylene-diamine and 25 parts of 6-ethoxy-2,2,4-trimethyl-dihydroquinoline;
(3) A mixture consisting of 65 parts of N,N'-diphenyl-p-phenylene-diamine and 35 parts of 6-ethoxy-2,2,4-trimethyl-dihydroquinoline;
(4) A mixture consisting of 50 parts of N,N'-diphenyl-p-phenylene diamine and 50 parts of 6-ethoxy-2,2,4-trimethyl-dihydroquinoline;
(5) A mixture consisting of 25 parts of N,N'-diphenyl-p-phenylene diamine and 75 parts of 6-ethoxy-2,2,4-trimethyl-dihydroquinoline;
(6) 6-ethoxy-2,2,4-trimethyl-dihydroquinoline.

The mixtures obtained are vulcanized in the form of profiled tests specimens of a thickness of 12 mm. at 2.1 atmospheric gauge=134° C. for 85 minutes each. The test specimens are then connected with one another to form an endless belt and subjected on a test machine of the Du Pont type (cf. Vanderbilt Rubber Handbook II. ed. (1936), page 164) to dynamic stresses of alternating bending (3.5 million times). The figures in the following table represent the estimated formation of cracks, which distinctly depends on the quantities of the components added to the vulcanizates.

| Test No. | 1 | 2 | 3 | 4 | 5 | 6 |
|---|---|---|---|---|---|---|
| Formation of cracks (estimated) | 3 | 2 | 1 | 0 | 2 | 3 |

The figures indicate the degree of crack formation as follows:

0 means no cracks.
1 means crack formation starts.
2 means pronounced crack formation.
3 means ruptures over 4 mm. length.

EXAMPLE 2

The rubber mixture described in Example 1 is divided into 7 parts and each part is mixed with one of the antioxidants or a mixture of antioxidants indicated below. The antioxidants are added at a proportion of 1.5% by weight referred to the rubber content.

(1) N-cyclohexyl-N'-phenyl-p-phenylene diamine;
(2) A mixture consisting of 75 parts of cyclohexyl-N'-phenyl-p-phenylene diamine and 25 parts of 6-ethoxy-2,2,4-trimethyl-dihydroquinoline;
(3) A mixture consisting of 65 parts of N-cyclohexyl-N'-phenyl-p-phenylene diamine and 35 parts of 6-ethoxy-2,2,4-trimethyl-dihydroquinoline;
(4) A mixture consisting of 50 parts of N-cyclohexyl-N'-phenyl-p-phenylene diamine and 50 parts of 6-ethoxy-2,2,4-trimethyl-dihydroquinoline;
(5) A mixture consisting of 35 parts of N-cyclohexyl-N'-phenyl-p-phenylene diamine and 65 parts of 6-ethoxy-2,2,4-trimethyl-dihydroquinoline;
(6) A mixture consisting of 25 parts of N-cyclohexyl-N'-phenyl-p-phenylene diamine and 75 parts of 6-ethoxy-2,2,4-trimethyl-dihydroquinoline;
(7) 6-ethoxy-2,2,4-trimethyl-dihydroquinoline.

The mixtures obtained are vulcanized in the form of profiled test specimens of a thickness of 12 mm. at 135° for 65 minutes. The test specimens are then connected with one another to form an endless belt as described in Example 1, which is placed on a test machine of the Du Pont type (see Example 1) and subjected to stresses of alternating bending (3.8 million times). Depending on the quantitative proportion of the components added, crack formation is as follows:

| Test No. | 1 | 2 | 3 | 4 | 5 | 6 | 7 |
|---|---|---|---|---|---|---|---|
| Formation of cracks (estimated) | 1 | 0 | 0.5 | 1 | 2 | 2.5 | above 3 |

The figures have the meaning indicated in Example 1.

EXAMPLE 3

A rubber mixture of the composition described in Example 1 is divided into 5 parts and each part is mixed with one of the antioxidants or mixtures of antioxidants given below. The antioxidants are added at a proportion of 1% referred to the rubber content.

(1) A mixture consisting of 65 parts of N,N'-diphenyl-p-phenylene diamine and 35 parts of 6-sec. butoxy-2,2,4-trimethyl-dihydroquinoline;
(2) A mixture consisting of 50 parts of N,N'-diphenyl-p-phenylene diamine and 50 parts of 6-sec.-butoxy-2,2,4-trimethyl-dihydroquinoline;
(3) A mixture consisting of 35 parts of N,N'-diphenyl-p-phenylene diamine and 65 parts of 6-sec.-butoxy-2,2,4-trimethyl-dihydroquinoline;
(4) A mixture consisting of 25 parts of N,N'-diphenyl-p-phenylene diamine and 75 parts of 6-sec.-butoxy-2,2,4-trimethyl-dihydroquinoline.

The mixtures obtained are vulcanized in the form of profiled test specimens of a thickness of 12 mm. at 2.1 atmospheric gauge=134° C. for 80 minutes each. The test specimens are then connected with one another to form an endless belt as described in Example 1, placed on a test machine of the Du Pont type and subjected to dynamic stresses by alternating bending (2.5 million times). Depending on the quantitative proportion of the components added to the vulcanisates, the formation of cracks is as follows:

| Test No. | 1 | 2 | 3 | 4 |
|---|---|---|---|---|
| Formation of cracks (estimated) | 1 | 0 | 0 | 1 |

The figures have the meaning indicated in Example 1.

EXAMPLE 4

A rubber mixture consisting of 100 parts of a copolymerizate of butadiene and styrene (type "GRS 1500"), 50 parts of a high abrasion furnace black, 5 parts of zinc oxide, 3 parts of a petrol origin softener (type "Circosol Oil-2XH"), 3 parts of a petrol origin softener (type "Paraflux-2016"), 1 part of stearic acid, 1.2 parts of sulfur, 1 part of benzothiazol-2-cyclohexylsulfenamide and 0.2 part of a condensation product of butyl aldehyde and aniline is devided into 4 parts. Each part is mixed with 1% by weight referred to the rubber content of the mixture with one of the following mixtures:

(1) A mixture consisting of 65 parts of N,N'-diphenyl-p-phenylene diamine and 35 parts of 6-sec.-butoxy-2,2,4-trimethyl-dihydroquinoline;
(2) A mixture consisting of 50 parts of N,N'-diphenyl-p-phenylene diamine and 50 parts of 6-sec.-butoxy-2,2,4-trimethyl-dihydroquinoline;
(3) A mixture consisting of 35 parts of N,N'-diphenyl-p-phenylene diamine and 65 parts of 6-sec.-butoxy-2,2,4-trimethyl-dihydroquinoline;
(4) A mixture consisting of 25 parts of N,N'-diphenyl-p-phenylene diamine and 75 parts of 6-sec.-butoxy-2,2,4-trimethyl-dihydroquinoline.

The mixtures obtained are vulcanized in the form of profiled test specimens of a thickness of 12 mm. and a width of 22 mm. for 65 minutes at 3 atmospheres gauge=143° C. The test specimens are then connected with one another as described in Example 1 to form an endless belt and subjected in the open air on a test machine of the Du Pont type to dynamic stresses of alternating bending (8 million times). The following figures represent the estimated formation of cracks which distinctly depends on the quantities of the components added to the vulcanisates:

| Test No. | 1 | 2 | 3 | 4 |
|---|---|---|---|---|
| Formation of cracks (estimated) | 1-2 | 0-1 | 1 | 2-3 |

The figures have the same meaning as indicated in Example 1.

We claim:

1. An improved rubber vulcanizate selected from the group consisting of natural rubber and a synthetic rubbery copolymer of butadiene and styrene, said vulcanizate being inhibited against flex-cracking by the incorporation therein, prior to vulcanization, of 0.1–5% by weight of a mixture consisting essentially of (1) 75–25 parts of a p-phenylene diamine derivative substituted at the nitrogen by a member selected from the group consisting of an alkyl-, isoalkyl-, cycloalkyl-, and an aryl group, and (2) 25–75 parts of a 2,2,4-trimethyl-dihydroquinoline substituted in the phenyl radical by an alkoxy group.

2. An improved rubber vulcanizate selected from the group consisting of natural rubber and a synthetic rubbery copolymer of butadiene and styrene, said vulcanizate being inhibited against flex-cracking by the incorporation therein, prior to vulcanization, of 0.1–5% by weight of a mixture consisting essentially of (1) N,N'-diphenyl-p-phenylenediamine, and (2) 6-sec.-butoxy-2,2,4-trimethyldihydroquinoline.

3. An improved rubber vulcanizate selected from the group consisting of natural rubber and a synthetic rubbery copolymer of butadiene and styrene, said vulcanizate being inhibited against flex-cracking by the incorporation therein, prior to vulcanization, of 0.1–5% by weight of a mixture consisting essentially of (1) N-cyclohexyl-N'-phenyl-p-phenylenediamine, and (2) 6-ethoxy-2,2,4-trimethyl-dihydroquinoline.

References Cited in the file of this patent

FOREIGN PATENTS 505,113    Great Britain _____ May 4, 1939